US00RE37026E

(19) United States
(12) Reissued Patent
Whalen

(10) Patent Number: US RE37,026 E
(45) Date of Reissued Patent: Jan. 23, 2001

(54) PIVOT ASSEMBLY FOR A STRUCTURED VEHICLE SEAT

(75) Inventor: John F. Whalen, Macomb, MI (US)

(73) Assignee: Fisher Dynamics Corporation, St. Clair Shores, MI (US)

(21) Appl. No.: 09/452,771

(22) Filed: Dec. 1, 1999

Related U.S. Patent Documents

Reissue of:
(64) Patent No.: 5,711,577
Issued: Jan. 27, 1998
Appl. No.: 08/565,987
Filed: Dec. 1, 1995

(51) Int. Cl.[7] ..... B60N 2/12
(52) U.S. Cl. ..... 297/361.1; 297/362.11; 297/362.14; 297/440.21; 297/452.18; 297/452.2
(58) Field of Search ..... 297/361.1, 362.11, 297/362.14, 440.21, 452.18, 452.22

(56) References Cited

U.S. PATENT DOCUMENTS

| | | | | |
|---|---|---|---|---|
| 4,585,273 | * | 4/1986 | Higgs et al. | 297/452.18 |
| 4,588,228 | * | 5/1986 | Nemoto | 297/452.18 |
| 4,890,888 | * | 1/1990 | Kostin | 297/440.21 |
| 4,962,963 | * | 10/1990 | Robinson | 297/362.11 |
| 5,123,706 | * | 6/1992 | Granzow et al. | 297/362.11 X |
| 5,199,764 | * | 4/1993 | Robinson | 297/362.11 X |
| 5,253,923 | * | 10/1993 | Gootee | 297/440.21 |
| 5,263,767 | * | 11/1993 | Ashjorsen et al. | 297/361.1 X |
| 5,269,589 | * | 12/1993 | Brothers et al. | 297/440.21 X |
| 5,292,178 | * | 3/1994 | Loose et al. | 297/362.11 X |
| 5,318,341 | * | 6/1994 | Griswold et al. | 297/362.11 |
| 5,435,624 | * | 7/1995 | Bray et al. | 297/362.11 X |
| 5,452,941 | * | 9/1995 | Halse et al. | 297/452.2 X |
| 5,462,332 | * | 10/1995 | Payne et al. | 297/362.14 X |
| 5,795,024 | * | 8/1998 | Collins et al. | 297/361.1 |
| 5,806,932 | * | 9/1998 | Zhuang | 297/361.1 |
| 5,826,944 | * | 10/1998 | Beneker et al. | 297/440.21 X |
| 5,895,090 | * | 4/1999 | Farquhar et al. | 297/362.14 X |
| 5,918,943 | * | 7/1999 | Mitschelen et al. | 297/362.11 X |

FOREIGN PATENT DOCUMENTS

| | | | | |
|---|---|---|---|---|
| 4303032 | * | 10/1992 | (JP) | 297/452.18 |
| 4303034 | * | 10/1992 | (JP) | 297/452.18 |

OTHER PUBLICATIONS

P.L. Porter drawing for Power Recliner, Part No. DPR1250–00, Oct. 26, 1993, revised as of Dec. 21, 1993.

P.L. Porter drawing for Upper Body, Part No. DPR1255–00, Nov. 11, 1993, revised as of Dec. 21, 1993.

P.L. Porter drawing for exploded Upper Body, Part No. DPR1294–00, Jan. 4, 1994, revised as of Feb. 16, 1994.

* cited by examiner

*Primary Examiner*—Peter M. Cuomo
*Assistant Examiner*—Rodney B. White
(74) *Attorney, Agent, or Firm*—Harness, Dickey & Pierce P.L.C.

(57) ABSTRACT

A pivot assembly for a structured vehicle seat assembly accommodates loads applied to the seatback through a safety belt restraint system carried by the seat assembly. The pivot assembly includes a connector member including an upper portion extending into a hollow channel defined by the seatback frame. The connector member is fixedly attached thereto. The pivot assembly further includes a housing attached to a lower seat structure for movement therewith between fore and aft positions. The connector member is pivotally mounted to the housing to thereby permit the seatback to rotate relative to the lower seat structure between a generally upright position and a reclined position. The pivot assembly further preferably includes a drive arrangement for rotating the connector member about a pivot axis. The pivot assembly functions to efficiently and effectively transfer loads from the seatback to the lower seat structure, and in turn, to the vehicle structure. Advantageously, the safety belt restraint system is adapted to move with the seat assembly.

24 Claims, 5 Drawing Sheets

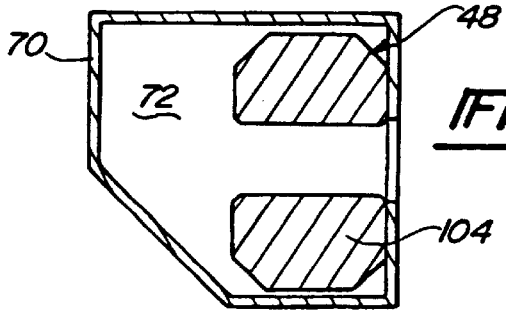
Fig - 3A
Fig - 3B
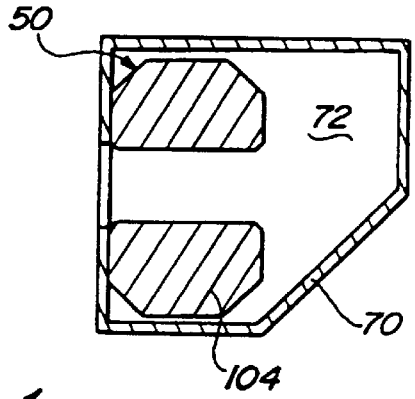
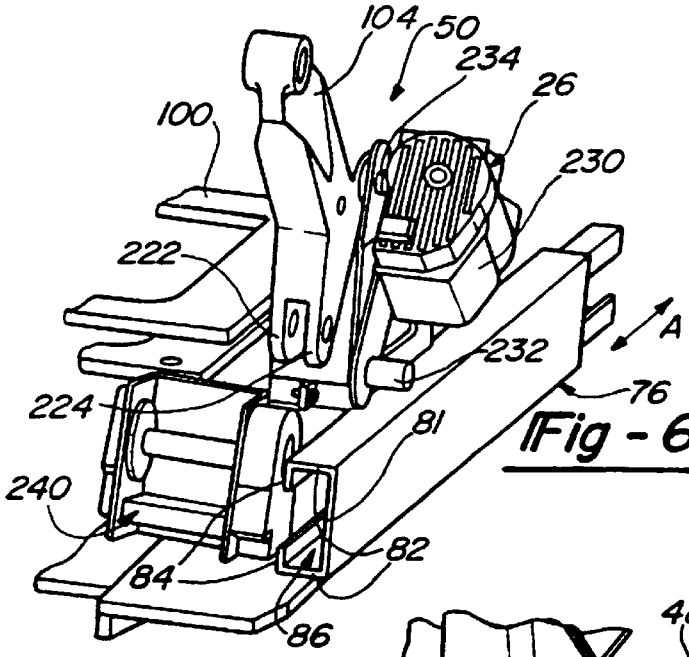
Fig - 6
Fig - 7
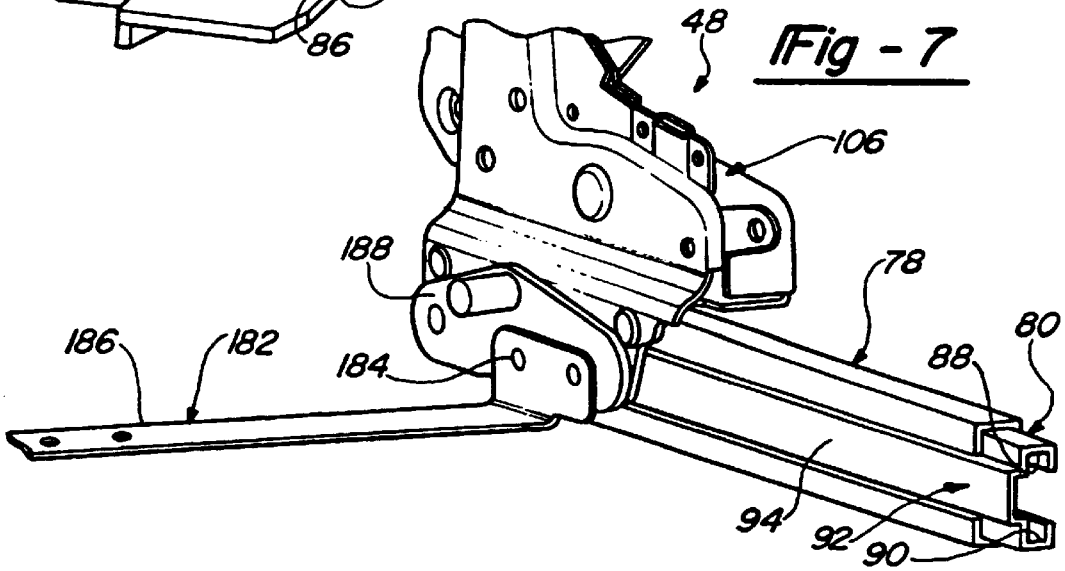

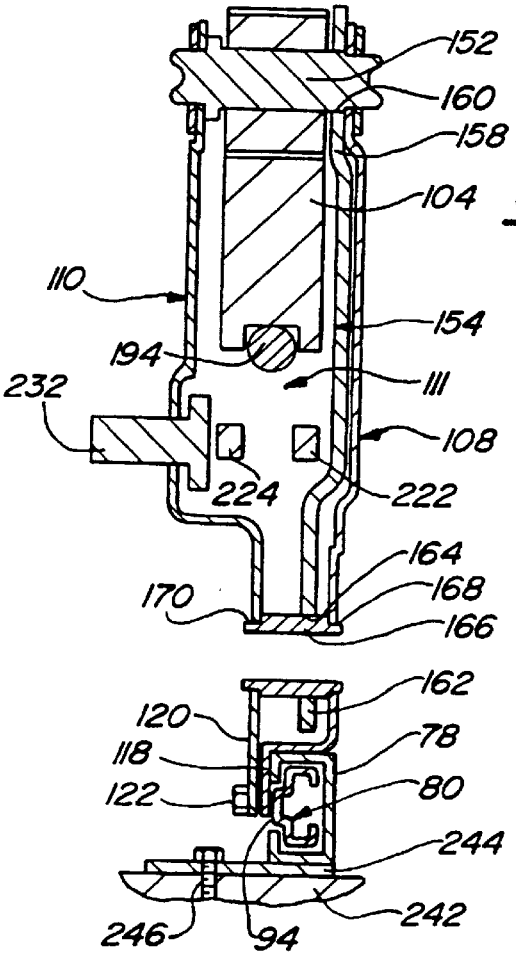
Fig - 11
Fig - 13
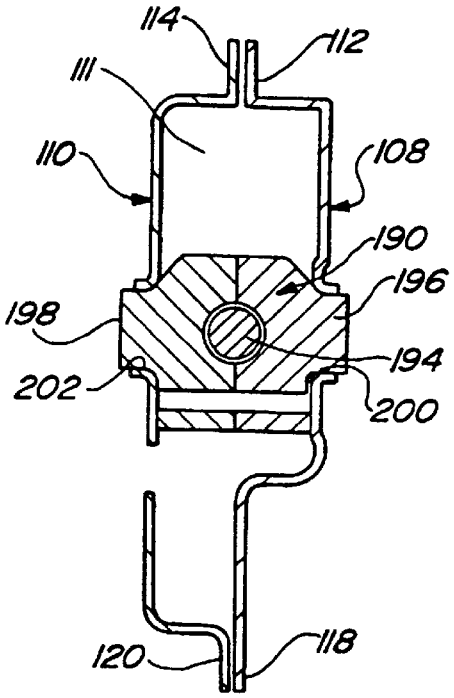
Fig - 12
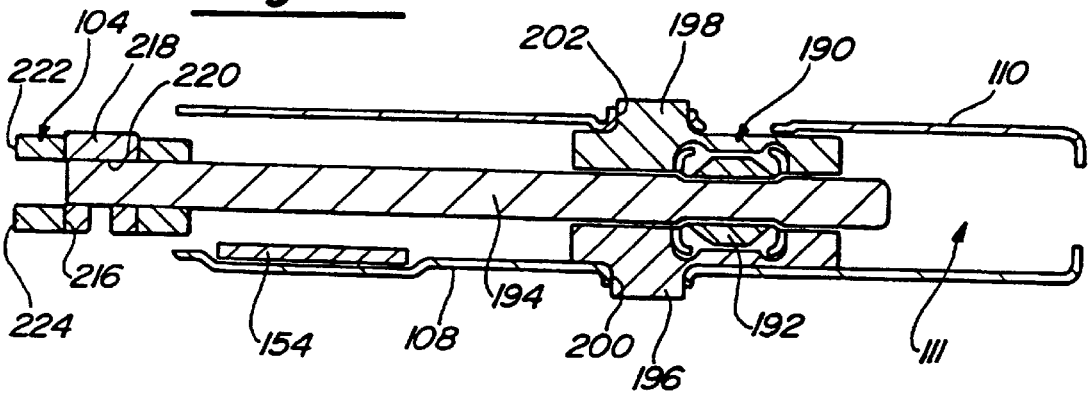

PIVOT ASSEMBLY FOR A STRUCTURED VEHICLE SEAT

Matter enclosed in heavy brackets [ ] appears in the original patent but forms no part of this reissue specification; matter printed in italics indicates the additions made by reissue.

BACKGROUND OF THE INVENTION

The present invention relates in general to a seat assembly for a motor vehicle. More particularly, the present invention relates to a pivot assembly for a structured vehicle seat of the type that carries a retractable safety belt and includes a seatback pivotally interconnected to a lower seat structure. The pivot assembly is configured to transfer the potentially significant safety belt loads that may be incurred during severe deceleration or vehicle collision from the seatback to the lower seat structure, and in turn, to the vehicle frame.

Virtually all motor vehicles are equipped with restraint systems including a retractable safety belt for physically restraining a seat occupant when the vehicle is subjected to a high rate of deceleration which may occur, for example, during a vehicle collision or during severe braking. In conventional vehicles, the retractable safety belts are predominantly attached directly to the vehicle structure. For example, most modern safety belt systems utilize a belt retractor mounted to the vehicle floor pan which adjustably receives the retractable belt. The retractable belt extends upward from the belt retractor along the B-pillar of the vehicle to a guide ring mounted to the B-pillar. The retractable belt then extends downward from the B-pillar guide ring adjacent to the belt retractor where an end of the retractable belt is connected to the vehicle floor. A tongue plate is mounted on the safety belt and is slidably movable therein between the end anchored to the vehicle floor and the guide ring on the B-pillar. A buckle is interconnected with the vehicle floor on the opposite side of the occupant seat.

When the tongue plate is pulled across the occupant and releasably inserted into the buckle, the retractable belt forms a lap belt portion across the occupant's midsection and a shoulder belt portion extending diagonally across the occupant's torso. The lap belt portion and shoulder belt portion cooperate to retain the occupant in the seat. While mounted to the vehicle frame independently from the seat, the safety belt restraint system is intended to be positioned in such a proximity to cooperate with the seat for effectively and comfortably restraining the seat occupant during severe deceleration.

While conventional safety belt restraint systems, such as the type described above, have proven to be commercial acceptable for many applications, each is attendant with drawbacks and subject to improvement. In many applications, the operation and comfort of such a conventional safety belt restraint system conflicts with the operational requirements of modern vehicle seat assemblies. In this regard, virtually all modern vehicles are equipped with seating assemblies that can be selectively adjusted in at least the fore and aft direction for providing increased comfort and convenience to the seat occupant. Furthermore, modern vehicle seat assemblies, particularly those intended for front seat applications, are almost exclusively constructed to include a seatback mounted for pivotal movement relative to a seat cushion for selective articulation between a generally upright position and a fully reclined position.

Through conventional adjustment of a seat assembly in the fore or aft direction, an occupant seated on the seat assembly is effectively translated relative to the mounting points (i.e, belt retractor, B-pillar guide ring, belt end connection, and tongue plate) of the safety belt restraint system. As a result, it frequently becomes inconvenient and uncomfortable for a seat occupant to correctly employ and/or utilize the safety belt restraint system, thereby often discouraging use of the safety belt restraint system. For example, if the vehicle seat assembly is selectively moved to a forwardmost position, it is often difficult for the seat occupant to reach back to grasp the seat belt tongue plate carried adjacent the B-pillar. This difficulty is particularly true with elderly occupants, occupants with physical disabilities and occupants of smaller physical stature. Furthermore, when the position of the vehicle seat assembly is forwardly adjusted, the shoulder belt portion of the retractable belt may abrade the seat occupant's neck, thereby resulting in occupant irritation or discomfort.

Other difficulties and problems are encountered when a conventional seat assembly is adjusted to its rearwardmost position. For example, the shoulder belt portion of the retractable belt is more susceptible to slight displacement from the upper torso of the restrained occupant. As a result, the occupant may be undesirably permitted to momentarily shift forward unrestrained by the shoulder belt portion of the retractable belt when the vehicle is subject to severe deceleration forces. Similar inconveniences are encountered by the vehicle occupant when the seatback is pivotally articulated from a standard operating position towards its fully reclined position. Furthermore, a restrained seat occupant having the vehicle seat in the rearwardmost position may be unable to move the seat to a more forward position without first readjusting the retractable belt.

The noted difficulties and inconveniences associated with conventional seat assemblies and safety belt restraint systems are further complicated in seating applications for convertible vehicles. In this regard, for obvious reasons, it is desirable for convertible vehicles to eliminate an upwardly extending B-pillar. As a result, the upper B-pillar mounting point for the retractable belt is often inconveniently positioned relative to the seat occupant, frequently resulting in less than ideal belt fit and occupant discomfort.

It is also known to mount a safety belt restraint system directly to a seat assembly. In such an arrangement, the structure of the seat assembly must be of sufficient strength to accommodate the potentially significant loads that may be generated as a result of vehicle deceleration from impact, severe braking, or the like. However, known "structured" seat assemblies have also been associated with various disadvantages. The primary problem with such known constructions resides in an inability to efficiently and effectively transfer deceleration loads received by the seatback to the vehicle structure. More specifically, known constructions for structured seat assemblies have been unable to fully retain the operation features (e.g., pivotally mounted seatback, fore and aft translation, etc.) demanded by consumers without utilizing complex arrangements for pivotally mounting the seatback to the lower seat structure. When functionally acceptable, these complex arrangements are often weight prohibitive, cost prohibitive, or both.

In view of the foregoing, a need clearly exists to develop a pivot assembly for vehicle seat assembly having a structured frame for absorbing loads received from an attached safety belt restraint system and transferring such loads to the vehicle frame. More specifically, a need exists to develop a vehicle seat assembly which efficiently and effectively overcomes the known shortcomings associated with vehicle seat constructions and yet which can be readily adapted for use in various vehicular seating applications.

SUMMARY OF THE INVENTION

Accordingly, it is an object of the present invention to provide an improved pivot assembly for a structured vehicle seat that is relatively simple in design and construction, inexpensive to fabricate and assemble, and yet is durable and highly reliable.

A more detailed object of the present invention is to provide a pivot assembly for a vehicle seat assembly having a belt restraint system mounted to and carried by the seat assembly so that regardless of the position of the seat assembly in the vehicle, the belt restraint system remains in a constant position relative to the seat occupant.

It is another object of the invention to provide a pivot assembly for a vehicle seat assembly capable of withstanding the safety belt loads incurred during a vehicle collision and transferring such loads to a lower seat structure and, in turn, to the vehicle frame.

It is a further object of the present invention to provide a pivot assembly fixedly attached to a seatback frame of a vehicle seat for interconnecting the seatback frame to a lower seat structure.

It is yet a further object of the present invention is to provide a pivot assembly incorporating an improved drive arrangement for rotating a seatback of a structured vehicle seat between a generally upright position and a fully reclined position.

These and other objects are provided by a structured vehicle seat assembly which includes an improved pivot assembly operative for transferring loads from an upper seatback frame to a lower seat structure. In a presently preferred arrangement, a vehicle seat assembly is constructed to include a first pivot assembly adjacent an inboard side and a second pivot assembly adjacent an outboard side. Each of the pivot assemblies preferably includes an integrally formed connector member which functions to interconnect the seatback frame and a lower seat structure.

In one form, the structured vehicle seat assembly of the present invention includes a lower seat structure and a seatback frame. The seatback frame is pivotally mounted relative to the lower seat structure for selective movement to angular reclined positions defined between a generally upright position and a fully reclined position. A safety belt restraint system is carried by the lower seat structure and the seatback frame. The structure vehicle seat assembly further includes a pivot assembly for pivotally interconnecting the seatback frame to the lower seat structure. Preferably, the pivot assembly is fixedly attached to the seatback frame.

In a more preferred form, the structured vehicle seat assembly of the present invention includes a lower seat structure having a seatpan frame and a slide assembly for selectively translating the seatpan frame in fore and aft directions. The structured vehicle seat assembly further includes a seatback frame pivotally interconnected to the lower seat structure for selective movement between plural angular positions relative to the lower seat structure. The seatback frame includes a lower end and an upwardly extending channel adjacent one of an inboard side and an outboard side of the seatback frame. The upwardly extending channel is open adjacent the lower end. A safety belt restraint system is attached to and carried by the lower seat structure and the seatback frame. The structured vehicle seat assembly further includes a pivot assembly for pivotally interconnecting the seatback frame to the lower seat structure for selectively rotation between a generally upright position and a fully reclined position. The pivot assembly includes a housing attached to the slide assembly and a generally boot-shaped connector member pivotally mounted to the housing for rotation about a pivot pin. The generally boot-shaped connector member includes an upper portion and which at least partially extends into the upwardly extending channel of the seatback frame. Preferably, the boot-shaped connector member is fixedly attached to the seatback frame.

BRIEF DESCRIPTION OF THE DRAWINGS

Further objects, features and advantages of the present invention will become apparent from analysis of the following written specification and the accompanying drawing and the appended claims in which:

FIGS. 3A and 3B are cross sections through the support tubes shown in phantom in FIG. 2;

FIG. 6 is a rear perspective view of a portion of the lower seat structure and outboard pivot assembly of the passenger seat assembly of FIG. 2 further illustrated to include a shoulder belt retractor and a lap belt retractor;

FIG. 7 is a partial front perspective view of the seat assembly of FIG. 2 illustrating the interconnection between the inboard pivot assembly, the lateral support member, and the slide assembly;

FIG. 11 is a cross-sectional view generally taken along the line 11—11 of FIG. 5 and further shown to include the associated slide assembly and mounting to the vehicle structure;

FIG. 12 is a cross-sectional view taken along the line 12—12 of FIG. 5; and FIG. 13 is a cross-sectional view taken along the line 13—13 of FIG. 5.

The following detailed description utilizes various terminology intended to indicate general direction for purposes of describing the figures to which reference is being made. For example, it will be understood that the terminology "inboard" and "outboard" will be used as a convenience to designate the lateral sides of the seat assembly. It will be further understood that the terminology "fore" and "aft" will be used to refer to directional movement of the seat toward the front of the vehicle and away from the front of the vehicle, respectively.

DETAILED DESCRIPTION OF THE PREFERRED EMBODIMENT

The present invention is directed to a structured seat assembly that is particularly well-suited for use in motor vehicle seating applications. More specifically, the present invention is directed to an improved pivot assembly for such a structured seat assembly. The exemplary seating arrangement shown throughout the drawings is illustrated to be specifically adapted for application in the front seating area of a motor vehicle as front driver and passenger seat assemblies. However, it is to be understood that the teachings of the present invention are not limited to the particular vehicle seating arrangement shown. That is, the illustrated application is merely an exemplary representation of the general type of environment into which the present invention may be incorporated.

Figure 1:
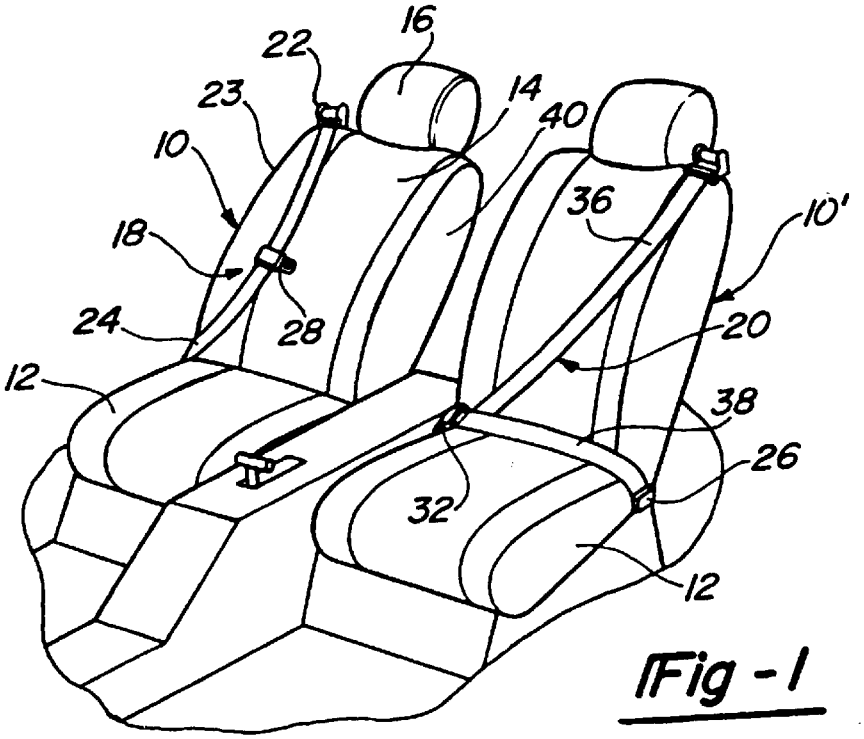
FIG. 1 is a front perspective view of a portion of a passenger seating area in an exemplary motor vehicle illustrating an exemplary pair of structured vehicle seat assemblies constructed in accordance with the teachings of a preferred embodiment of the present invention.

Referring now generally to the drawings in which like elements are identified with identical reference numerals throughout, and particularly to FIG. 1, a portion of a front seating area of a motor vehicle is shown to include a pair of independently positionable seat assemblies constructed to include pivot assemblies in accordance with the teachings of the present invention. For ease of reference, the passenger seat assembly shown on the left-hand side of FIG. 1 is identified throughout the drawings as reference numeral 10 and the similarly constructed driver seat assembly is identified with reference numeral 10'. It will be understood that passenger seat assembly 10 and driver seat assembly 10' are functionally identical, and further that the construction of driver seat assembly 10' is a mirror image to that of passenger seat assembly 10. Thus, while the remainder of this detailed description will focus primarily on the construction and operation of passenger seat assembly 10, a thorough understanding of driver seat assembly 10' will be apparent therefrom.

Seat assembly 10 is illustrated to include a seat cushion 12, a padded seatback 14, and a headrest 16 for supporting a vehicle occupant (not shown) in a conventional manner. When in a standard operating position as illustrated in FIG. 1, seatback 14 extends upwardly at the rear of seat cushion 12 and is angled slightly rearward. As will be discussed in further detail below, seatback 14 is mounted for pivotal adjustment relative to its corresponding seat cushion 12 for occupant convenience and comfort. That is, seatback 14 is pivotally adjustable to plural angular positions defined between the standard operating position, or generally upright position, and a fully reclined position (not specifically shown).

Seat assembly 10 is further shown to include a safety belt restraint system 18 mounted to and carried by seat assembly 10. In the exemplary embodiment illustrated in FIG. 1, safety belt restraint system 18 is shown to include a retractable belt 20 adapted for restraining the seat occupant in a seated position adjacent seat cushion 12 and padded seatback 14 when the vehicle is subject to severe deceleration forces due to severe braking or a vehicle collision. Retractable belt 20 is shown to extend outwardly from seat assembly 10 adjacent a top outboard corner of seatback 14 where it engages a belt slide assembly 22. It will be appreciated by those skilled in the art, that belt slide assembly 22 is vertically adjustable to comfortably accommodate seat occupants of varying heights.

As shown with respect to the seat assembly 10, retractable belt 20 extends downwardly along an outboard side 23 of seat assembly 10 when not in use. An end 24 of retractable belt 20 is interconnected to seat assembly 10 through a lower belt retractor 26 (shown in FIG. 1 in connection with driver seat assembly 10'). A tongue plate 28 is adjustably positioned on retractable belt 20 between belt slide assembly 22 and lower belt retractor 26. A cooperating buckle component 32 is attached to an inboard side 40 of seat assembly 10 and is specifically adapted for releasable engagement of tongue plate 28 in a generally convention manner.

As illustrated with respect to driver side seat assembly 10', when tongue plate 28 is inserted into buckle component 32, retractable belt 20 forms an adjustable shoulder belt portion 36 for diagonally traversing the torso of the seat occupant and an adjustable lap belt portion 38 for traversing the seat occupant's waist. Shoulder belt portion 36 extends from belt slide assembly 22 to the lower portion of inboard side 40 of seat assembly 10. Safety belt restraint system 18 of seat assembly 10 of the present invention has been shown and described in this manner. However, nothing herein should be construed so as to limit seat assembly 10 of the present invention to any specific safety belt restraint system. That is, the teachings of the present invention are applicable for use with any of a number of safety belt restraint systems and the system illustrated should merely be considered to be exemplary.

With reference to FIGS. 2 through 5, seat assembly 10 shown in FIG. 1 is illustrated with its upholstery, padding, headrest 16 and safety belt restraint system 18 removed to more clearly illustrate the novel structure and operational features of the present invention. Seat assembly 10 is shown generally to include a seatback frame 42 and a lower seat structure 44. Seat assembly 10 is shown to further include a pivot arrangement 46 which preferably comprises an inboard board assembly 48 and an outboard pivot assembly 50. As will become more apparent below, inboard and outboard pivot assemblies 48 and 50 cooperatively operate for pivotally mounting seatback frame 42, and in turn seatback 14, relative to lower seat structure 44 for rotation between plural angular positions.

Through inboard and outboard pivot assemblies 48 and 50, seatback frame 42 is pivotally movable between the standard operating position and the fully reclined position. Inboard and outboard pivot assemblies 48 and 50 further cooperate to transfer loads applied to seatback frame 42 (e.g., directly from the seat occupant or indirectly through retractable belt 20) to lower seat structure 44. The primary focus of the present invention is directed to the construction and operation of inboard and outboard pivot assemblies 48 and 50 and their interconnection with cooperating structure of seatback frame 42 and lower seat structure 44. However, a further understanding of the exemplary seatback frame 42 and lower seat structure 44 with which pivot assemblies 48 and 50 are specifically adapted to cooperate is warranted prior to turning to the details of pivot assemblies 48 and 50.

Figure 2:
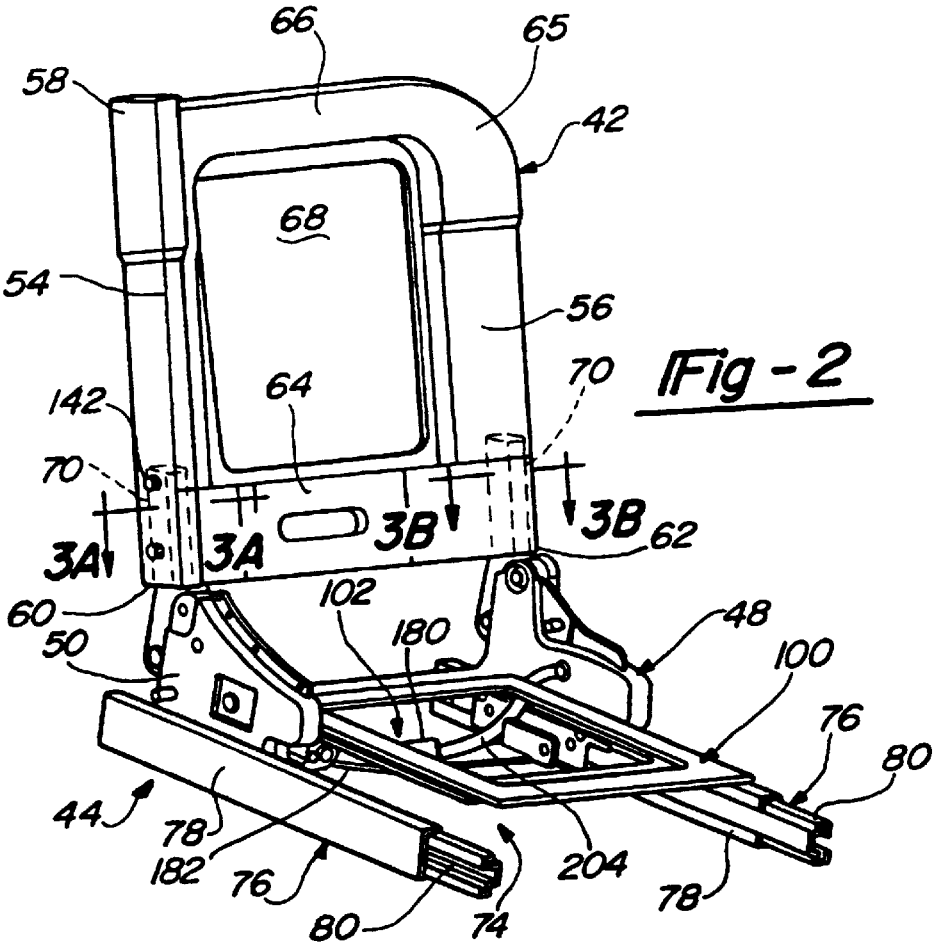
FIG. 2 is an enlarged front perspective view of the passenger seat assembly shown in FIG. 1, with the upholstery, cushions, and safety belt restraint system removed to illustrate in detail its components.

With specific reference to FIG. 2, seatback frame 42 is generally rectangular in shape and includes a hollow outboard beam 54 upwardly extending along outboard side 23 of seat assembly 10 and a corresponding hollow inboard beam 56 upwardly extending along inboard side 40 of seat assembly 10. Outboard beam 54 is open at an upper end 58 and is adapted to receive safety belt slide assembly 22. Adjacent their respective lower ends 60 and 62, inboard and outboard beams 54 and 56 are interconnected by a lower intermediate member 64. Lower ends 60 and 62 of inboard and outboard beams 54 and 56, respectively, are open, thereby defining two parallel channels (not specifically shown) accessible from the lower end of seatback frame 42.

Upper end 58 of outboard beam 54 and an upper end 65 of inboard beam 56 are interconnected by an upper intermediate member 66. As will be appreciated more fully below, inboard and outboard beams 54 and 56 are specifically adapted to receive a portion of pivot assemblies 48 and 50, respectively, and thereby interconnect seatback frame 42 with lower seat structure 44. Seatback frame 42 is preferably unitarily constructed of steel or other suitable high strength material.

Seatback frame 42, while providing the additional structure and strength necessary to accommodate potentially significant seat belt loads, utilizes efficient management of material, thereby avoiding the use of excess material where not required. One example of this efficient management of material is that seatback frame 42 is generally rectangular in shape having a substantially rectangular central aperture 68 for purposes of weight reduction and functions to direct loads downward to pivot assemblies 48 and 50. A second example of this material management is that seatback frame 42 further is constructed to include a pair of support tubes 70, shown in phantom in FIG. 2 and further shown in the cross-sectional views of FIGS. 3A and 3B, located in inboard and outboard beams 54 and 56. Support tubes 70 function to sufficiently strengthen seatback frame 42 for interconnection with and transferring seat belt loads to pivot arrangement 46 without adding unnecessary weight or interfering structure. As shown in the cross-sectional views of FIGS. 3A and 3B, support tubes 70 define channels 72 for directly receiving a portion of inboard and outboard pivot assemblies 48 and 50. The specific interconnection between support tubes 70, inboard and outboard beams 54 and 56 and pivot assemblies 48 and 50 will be discussed in detail below.

With continued reference to FIG. 2 and additional reference to FIGS. 6 and 7, lower seat structure 44 of seat assembly 10 is shown to include a seat adjustment mechanism 74 of the type commonly referred to as "two-way" adjuster that is adapted to permit a seat occupant to selectively adjust the longitudinal (i.e., "fore" and "aft) position of a seat cushion 12 and seatback 14. To provide means for such a longitudinal adjustment, seat adjustment mechanism 74 includes a pair of laterally spaced seat slide devices 76 which each include an outer track member 78 and an inner track member 80. While not specifically illustrated, it will be understood by those skilled in the art that seat adjustment mechanism 74 further includes a generally conventional device (not shown) operably coupled to inner track members 80. The device is selectively actuable for permitting synchronous movement of inner track members 80 relative to outer track members 78.

In the embodiment illustrated, outer track members 78 are elongated structural members which are similarly configured to include a generally C-shaped cross-section. Outer track member 78 more specifically includes a side wall 81 and a pair of horizontally spaced legs 82 extending therefrom. Formed at the distal end of each horizontally spaced leg 82 is an inwardly bent lip or flange 84. Thus, outer track members 78 cooperate to define elongated slide channels 86 having an inwardly facing open portion.

Inner track members 80 are shown as elongated structural members having a modified C-shaped cross-sections. Inner track members 80 are sized to be cooperatively received within elongated slide channels 86 of the respective outer track members 78. More specifically, inner track members 80 are identically constructed to each include an upper U-shaped segment 88 and a lower U-shaped segment 90 retained within the slide channels 86 defined by the corresponding outer track members 80. Inner track member 78 further includes a mounting segment 92 interdisposed therebetween. Mounting segment 92, which interconnects segment 88 and segment 90, also has a U-shape and further includes a generally vertical side 94 slidably disposed within the inwardly facing open portion of outer track member 78. Thus, inner track members 80 are interlocking interfitted with their corresponding outer track member 78 in a manner which facilities the transfer of vertically directed loads to the vehicle's sill or floor structure.

As noted, each inner track member 80 is slidably mounted with respect to its corresponding outer track member 78 for relative bi-directional movement in the fore and aft directions as indicated by Arrow A in FIG. 6. As will be appreciated by those skilled in the art, suitable bearings (not shown) or other functionally equivalent structure may be incorporated between outer track member 78 and inner track member 80 to facilitate sliding movement therebetween.

Lower seat structure 44 is further shown to include a reinforced seatpan frame 100. Seatpan frame 100 is generally rectangular in construction and includes a rectangular aperture 102 for purposes of overall weight reduction and to facilitate mounting of appropriate springs and padding (not shown). Seat mounting fasteners (not shown), such as threaded studs and nuts, serve to secure seatpan frame 100 to a mounting bracket (not shown), which is in turn secured to inner track member 80. In this manner, seatpan frame 100 is mounted for sliding movement with inner track members 80 on outer track members 78.

With general reference to FIGS. 2–13, inboard and outboard pivot assemblies 48 and 50 of the present invention will now be described. To a significant degree, inboard pivot assembly 48 and outboard pivot assembly 50 are identical in construction and function. To facilitate description thereof, inboard pivot assembly 48 will first be described and subsequently the differences of outboard pivot assembly 50 will be addressed. Common reference numerals will be used between the pivot assemblies 48 and 50 to denote substantially identical components.

Inboard pivot assembly 48 is illustrated to include a connector member 104, or pivot arm, which is pivotally attached to a housing 106. In a manner which will be described below, housing 106 is, in turn, attached to the inboard inner track member 80 of slide device 72. Housing 106 is shown to be preferably constructed to include an outer plate member 108 and an inner plate member 110 which cooperate to define a housing cavity 111. Outer plate member 108 and inner plate member 110 each include a main body portion having a generally shoe-shape.

Outer and inner plate members 108 and 110 are joined at their respective upper edges through a pair of cooperating mounting flanges 112 and 114 integrally formed with outer and inner plate members 108 and 110, respectively. Suitable fasteners 116, such as rivets, pass through apertures 118 formed in each of the pair of mounting flanges 112 and 114. Adjacent its lower end, outer plate member 108 includes a mounting flange 119 for cooperating with a downwardly extending lower edge 120 of inner plate member 110. Lower edge 120 and flange 119 are joined by way of suitable fasteners such as rivets 121 and, in turn, jointly attached to vertical side 94 of inner track member 80 with bolts 122. Thus, inboard pivot assembly 48 is mounted for bi-directional translational movement with inner track member 80 between fore and aft positions.

Figure 4:
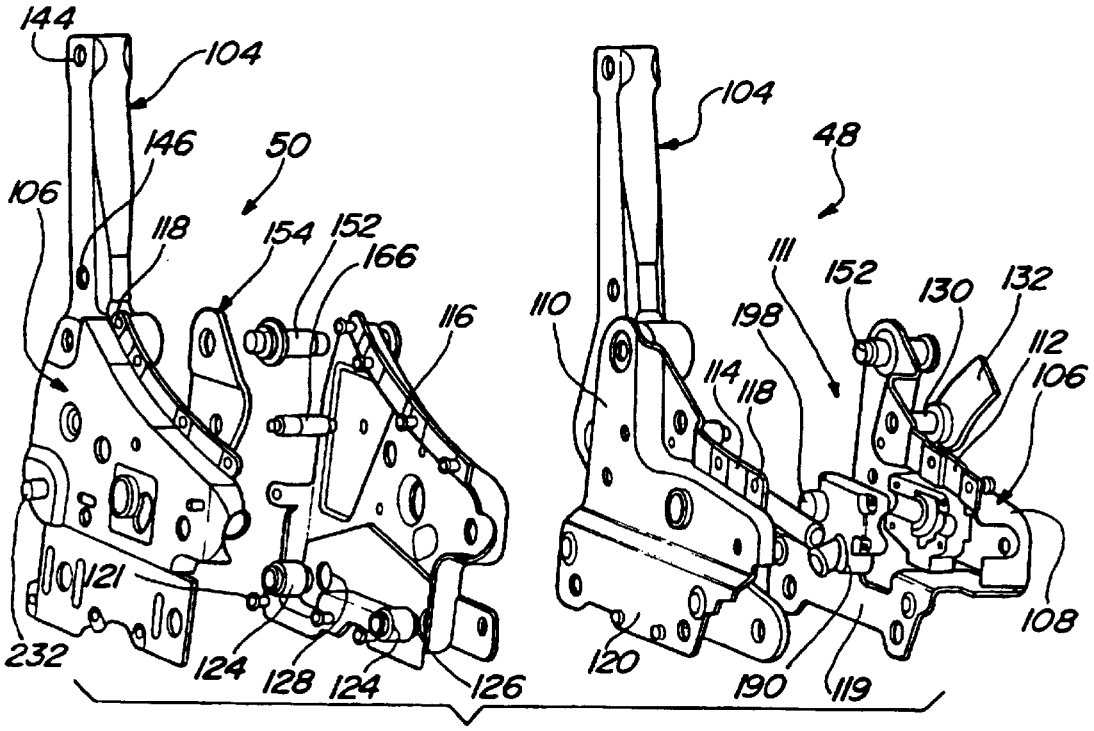
FIG. 4 is a partially exploded view of the inboard and outboard pivot assemblies of the pivot arrangement shown in FIG. 2.

Spacing is maintained between the outer and inner plate members 108 and 110 through a pair of generally cylindrical mounting spacer 124 (shown in FIG. 4). Each mounting spacer 124 includes a reduced diameter portion 126 at each of its ends which is adapted to be received into corresponding cylindrical apertures 128 formed on the inner sides of the outer plate member 108 and inner plate member 110. A mounting stud 130 outwardly extends from outer plate 108 to which a belt portion (partially shown at 132) is interconnected. Belt portion 132 is attached to buckle member 32.

Figure 8:
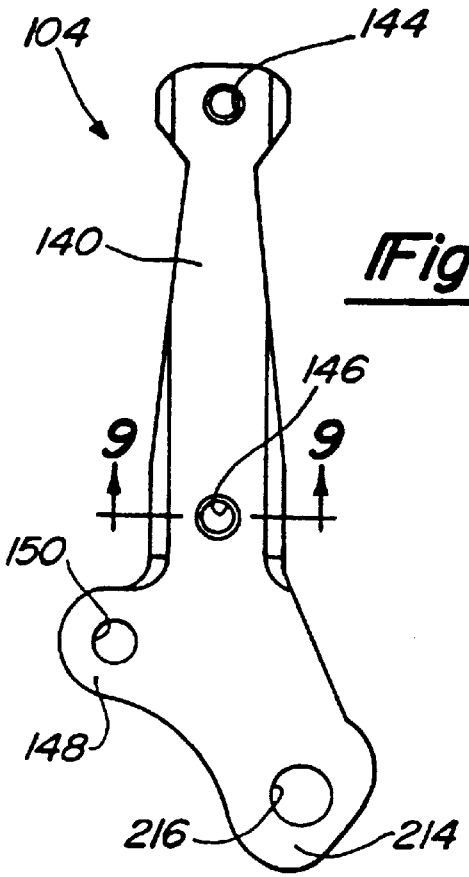
FIG. 8 is an enlarged side view of one of the inboard connector member shown in FIGS. 2 through 6.
Figure 9:
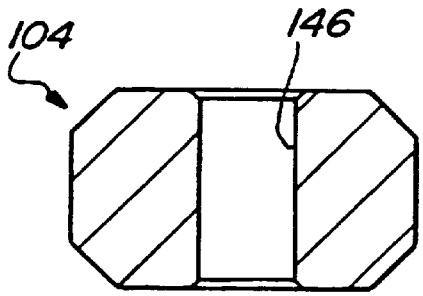
FIG. 9 is a cross-sectional view taken along the line 9—9 of FIG. 8.
Figure 10:
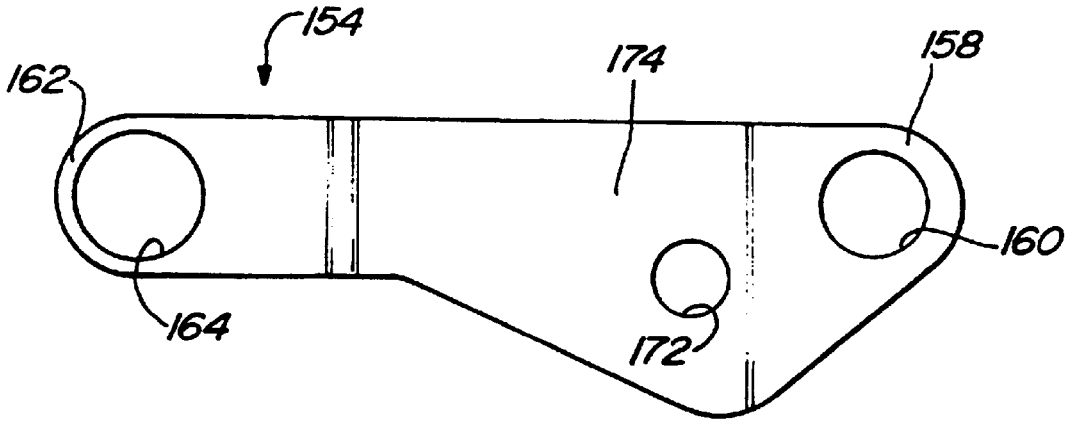
FIG. 10 is an enlarged side view of the tie bar shown in FIG. 2.

As specifically shown in FIG. 8, connector member 104 is illustrated to be generally boot-shaped in construction and is configured so as to be partially extended into upwardly extending channel 72 defined by support tube 70. More particularly, connector member 104 is shown to include an upwardly extending portion 140, or arm, adapted to be received into upwardly extending channel 72 as shown in FIG. 3. Connector member 104 is fixedly interconnected with seatback frame 42 through a pair of threaded bolts 142 (shown in FIG. 2) or other suitable fasteners which pass through a pair of threaded apertures 144 and 146 in connector member 104 and aligning apertures (not shown) formed in support tube 70 and inboard beam 56 of seatback frame 42. Apertures 144 and 146 provide two point contact for fixedly interconnecting connector member 104 with seatback frame 42.

Figure 5:
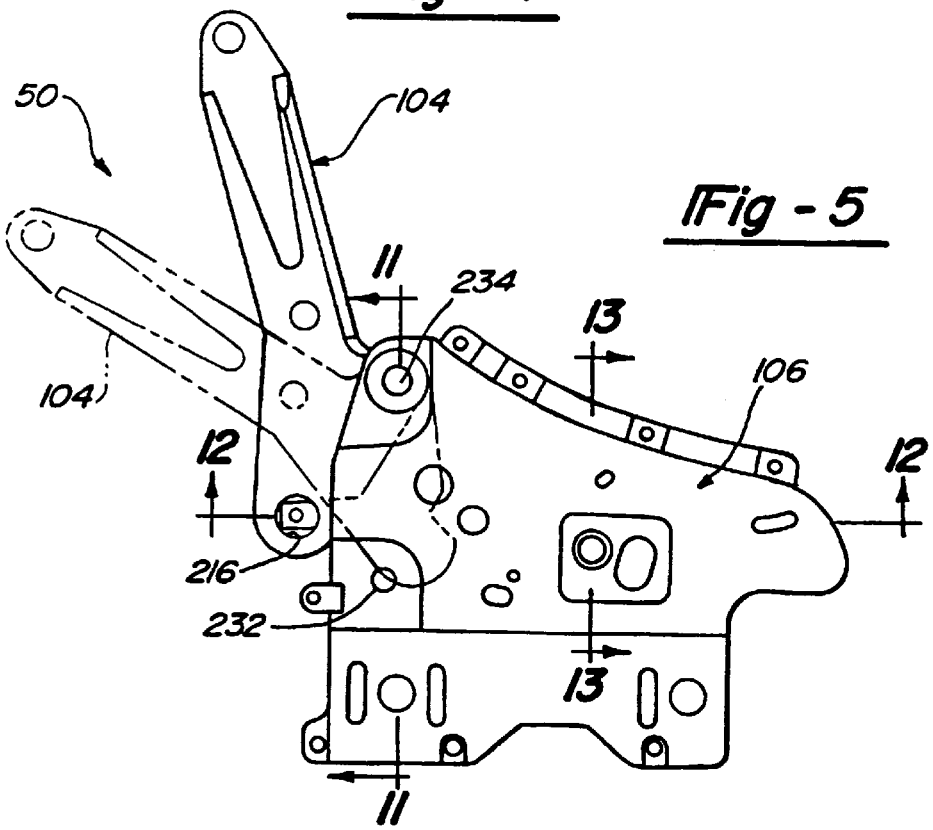
FIG. 5 is an enlarged side view of the outboard pivot assembly of FIGS. 2 and 4 showing its components in greater detail and illustrating the associated connector member in a standard operating position and in phantom illustrating the connector member rotated toward a reclined position.

Connector member 104 includes a heel portion 148 including an aperture 150 defining a pivot axis about which connector member 104 can be selectively rotated. In this regard, as shown in FIG. 5, connector member 104 is shown in solid lines in its standard operating position and in phantom lines in a reclined position. A pivot pin 152 passes through aperture 150 and serves to pivotally interconnect connector member 104 and pivot assembly housing 106.

In the preferred embodiment, connector member 104 is unitarily constructed of aluminum through an extrusion process. However, it will be appreciated by those skilled in the art that connector member 104 may be alternatively constructed by forging, casting or by any other well known manner from aluminum or other suitable material exhibiting sufficient strength requirements. Aluminum is the material of choice due to its physical characteristics and relatively light weight. In addition, aluminum is a relatively inexpensive material which is easily formed. In one application, connector member 104 is approximately eleven inches in length.

As noted above, outboard pivot assembly 50 is similar in construction and function to inboard pivot assembly 48. With specific reference to FIGS. 4, 10 and 11, the differences residing in outboard pivot assembly 50 will now be discussed. Outboard pivot assembly 50 incorporates a slightly altered construction to accommodate the attachment of retractable belt 20 to the outboard side 23 of seatback 42. Specifically, outboard pivot assembly 50 is illustrated to additionally incorporate means for distributing force loads received from seatback frame 42 and localized at pivot pin 152 which passes through the pivot axis of connector member 104. In the preferred embodiment, the means for distributing loads received from seatback 42 comprises a generally planar tie bar member 154. Tie bar member 154 is preferably shown to be unitarily constructed of high strength steel or other suitable material and functions to reduce loads concentrated about a pivot axis define by pivot pin 152. A portion of the loads is transferred to multiple points of the pivot assembly housing 106. As a result, the overall weight and dimensions of pivot assembly housing 106 are able to be reduced compared to a housing construction otherwise capable of accommodating the potentially significant loads from seatback 42.

Tie bar member 154 is disposed within cavity 111 adjacent the inner side of outer plate member 108. To facilitate general mating of tie bar member 154 with outer plate member 108, tie bar member 154 is formed to include an upper stepped portion and a lower stepped portion. Tie bar member 154 is further formed to include a mounting aperture 160 adjacent a first end 158, or upper end, which receives pivot pin 152. Similarly, adjacent a second end 162, or lower end, tie bar member 154 is formed to include a mounting aperture 164. Mounting aperture 164 receives a mounting spacer 166 which is received in apertures 168 and 170 located in outer plate member 108 and inner plate member 110, respectively. A clearance hole 172 is provided in a central portion 174 of tie bar member 154.

Seat assembly 10 is further shown to include a drive arrangement for selectively rotating connector member 104 about its pivot axis and thereby rotating seatback 14 between its operating position and its reclined position. The drive arrangement is illustrated to include a drive motor (partially shown at 180) mounted to a lateral stabilization bracket 182 by bolts (not shown) or other suitable fasteners. Lateral stabilization bracket 182, shown most clearly in FIG. 7, includes a pair of mounting portions 184 disposed at opposite ends of a central portion 186 which are generally perpendicular to central portion 186. The mounting portions 184 are secured to mounting flanges 188, which are in turn secured to one of the pivot assembly housings 106.

Drive arrangement is further illustrated to include a drive unit 190 located in each of the cavities 111 of the inboard and outboard pivot assemblies 48 and 50. In the embodiment illustrated, drive unit 190 is a right angle drive unit including a 45° bevel gear 192 interconnected with a threaded lead screw 194. Drive unit 190 includes a pair of cylindrical extensions 196 and 198 which partially extend through apertures 200 and 202 formed in outer plate member 108 and inner plate member 110, respectively. Cylindrical extensions 196 and 198 function to locate drive unit 190 within cavity 111. Drive unit 190 is interconnected with motor 180 through a drive cable 204. In a manner that will be understood by those skilled in the art, selective actuation of drive motor 180 causes drive cable to rotate in one of two opposite directions, thereby turning bevel gear 192 in one of two opposite directions. Such turning of bevel gear 192 results in corresponding rotation of lead screw 194.

Lead screw 194 is interconnected with connector member 104 for driving connector member 104 about its pivot axis. In this regard, connector member 104 includes a toe portion 214 including an internally threaded aperture 216 which receives an externally threaded pin 218. Pin 218 is formed to include an internally threaded aperture 220 disposed generally perpendicular to the axis defined by pin 218. The internal threads of aperture 220 are operative for engaging the threads of lead screw 194. Toe portion 214 of connector member 104 is further shown to include a pair of flange-like portions 222 and 224 which are spaced apart and through which aperture 216 passes. A space between flanges 222 and 224 provides operational clearance for threaded lead screw 194.

A manually actuated button (not shown) accessible by the seat occupant in a conventional manner operates to selectively control drive motor 180 and thereby rotate lead screw 194. As is now apparent, rotation of lead screw 194 in turn causes connector member 104 to pivot about its pivot pin 152. In so doing, seatback 14 can be selectively rotated between its standard upright position and various inclined positions, with the degree of reclination of seatback 14 being a function of the rotated position of lead screw 194.

As shown in FIG. 6, lower belt retractor 26 is attached to outboard pivot assembly 50 through a bracket 230. Bracket 230 is mounted to a threaded stud 232 and an outwardly extending end 234 of pivot pin 152. Retractable belt 20 extends upwardly from lower belt retractor 26. Seat assembly 10 is further shown to include an upper belt retractor 240 mounted to inner track member 80 with bolts (not shown) or other suitable fasteners. Upper belt retractor 240 adjustably receives an end (not shown) of retractable belt 20. Retractable belt 20 extends upwardly therefrom to belt slide assembly 22.

With reference to the cross-sectional view of FIG. 11, seat assembly 10 is illustrated to be attached to the vehicle floor 242, or sill, through a mounting bracket 244. In this regard, outer track member 78 of slide assembly 76 is fixedly attached to mounting bracket 224 by bolts or rivets (not shown). In turn, mounting bracket 244 is attached to vehicle floor 242 with suitable threaded fasteners 246. Thus, safety belt restraint system 18 is interconnected with the vehicle structure through seat assembly 10.

During a vehicle collision or severe deceleration, the loads applied to seatback 14 by shoulder belt portion 36 of retractable belt 20 produce significant loads in seatback frame 42. The loads in seatback frame 42 are transferred to lower seat structure 44 through pivot arrangement 46. Loads are similarly transferred from seatback 42 to lower seat structure 44 if the vehicle is subject to a rear-end collision. Thus, an improved design for a pivot arrangement which efficiently and effectively transfers seatback loads to vehicle structure through a structured vehicle seat is provided.

The pivot assembly of the present invention thus accomplishes the aforementioned objects by contributing to seat assembly 10 to which safety belt restraint system 18 is carried to efficiently and effectively overcome the discussed inconveniences of having a retractable belt 20 directly coupled to the vehicle structure with seat assembly 10 movable relative to safety belt restraint system 18. In accomplishing these objectives, seat assembly 10 has retained the functional requirements of traditional vehicle seating structures while providing the necessary strength to accommodate the potentially significant loads which may be applied thereto by the safety belt restraint system 18.

While a specific embodiment of the invention has been shown and described in detail to illustrate the principles of the present invention, it will be understood that the invention may be embodied otherwise without departing from such principles. For example, one skilled in the art will readily recognize from such discussion and from the accompanying drawings and claims that various changes, modifications and variations can be made therein without departing from the spirit and scope of the invention as defined in the following claims.

I claim:

1. A structured vehicle seat, comprising:

a lower seat structure;

a seatback frame defining an upwardly extending channel;

a safety belt restraint system mounted to and carried by the structured vehicle seat; and a pivot assembly interconnecting said seatback frame to said lower seat structure, said pivot assembly including a rotatable connector member *unitarily constructed of aluminum and* having a seatback mounting portion fixedly interconnected to the seatback frame and a seat mounting portion pivotally interconnected to the lower seat structure, said seatback mounting portion of said pivot assembly extending within said upwardly extending channel;

said seatback mounting portion of said rotatable connector member includes a pair of spaced apertures which align with a pair of correspondingly spaced apertures in said seatback frame for receiving a pair of fasteners to interconnect said seatback mounting portion and said seatback frame; and whereby said pivot assembly is operative for interconnecting said seatback frame to said lower seat structure such that the seatback frame is selectively adjustable to a plurality of angular positions.

2. The structured vehicle seat of claim 1, wherein said seat mounting portion includes an aperture rotatably receiving a pivot pin interconnected to said lower seat structure.

3. The structured vehicle seat of claim 2, wherein said aperture of said seat mounting portion is spaced from a line passing through said pair of spaced apertures in said seatback mounting portion of said rotable connector member.

4. The structured vehicle seat of claim 1, further comprising a pivot housing fixedly attached to said lower seat structure and a tie bar member, said tie bar member interconnected at a first point to said rotatable connector member and interconnected to said pivot housing at a second point, said second point being spaced apart from said first point.

5. The structured vehicle seat of claim 1, further comprising a drive mechanism for rotating said rotatable connector member about said pivot axis and thereby pivoting said seatback frame relative to said lower seat structure to adjust the angular position of said seatback frame relative to said lower seat structure.

6. The structured vehicle seat of claim 5, wherein said drive mechanism is pivotally coupled to said rotatable connector member.

7. The structured vehicle seat of claim 6, wherein said drive mechanism includes a lead screw rotationally mounted to said lower seat frame and longitudinally extending relative to the seat assembly, said lead screw including a plurality of external threads and a distal end coupled to said connector member, whereby rotation of said lead screw in a first direction upwardly pivots said seatback frame and rotation in a second direction downwardly pivots said seatback frame.

8. A structured vehicle seat assembly comprising:

a lower seat structure;

a seatback frame having an inboard side and an outboard side, said seatback frame including an upwardly extending channel adjacent one of said inboard side and said outboard side;

a safety belt restraint system mounted to and carried by the seat assembly;

a pivot assembly for interconnecting said seatback frame to said lower seat structure, said pivot assembly including a rotatable connector member *unitarily constructed of aluminum and* having an upper portion extending into said upwardly extending channel and fixedly attached to said seatback frame and a lower portion having an aperture receiving a pivot pin non-rotatably interconnected to said lower seat structure; and a drive mechanism for rotatably driving said rotatable connector member about said pivot pin, said drive mechanism includes a lead screw rotationally mounted to said lower seat frame and longitudinally extending relative to the seat assembly, said lead screw including a plurality of external threads and a distal end coupled to said rotatable connector member;

whereby said pivot assembly is operative for interconnecting said seatback frame to said lower seat structure such that said seatback frame is selectively adjustable to a plurality of angular positions.

9. The structured vehicle seat of claim 8, wherein said rotatable connector member includes an internally threaded aperture in meshing engagement with said plurality of external threads of said lead screw.

10. The structured vehicle seat of claim 8, wherein said rotatable member includes a drive aperture receiving a pivot pin, said pivot pin including an internally threaded aperture in meshing engagement with said plurality of external threads of said lead screw.

11. The structured vehicle seat of claim 8, further comprising a pivot housing fixedly attached to said lower seat structure and a tie bar member, said tie bar member interconnected at a first point to said rotatable connector member and interconnected to said pivot housing at a second point, said second point being spaced apart from said first point.

12. The structured vehicle seat of claim 8, wherein said upper portion of said rotatable connector member includes a pair of spaced apertures which align with a pair of correspondingly spaced apertures in said seatback frame for receiving a pair of fasteners to interconnect said upper portion and said seatback frame.

13. The structured vehicle seat of claim 12, wherein said aperture of said lower portion is spaced from a line passing through said pair of spaced apertures in said upper portion of said rotatable connector member.

14. The structured vehicle seat of claim 13, wherein said drive aperture and said aperture of said lower portion are on opposing sides of the line passing through said pair of spaced apertures in said upper portion.

15. A structured vehicle seat assembly comprising:

a lower seat structure including a seatpan frame and a slide assembly for selectively translating said seatpan frame in a fore direction and an aft direction;

a seatback frame including an inboard side and an outboard side, said seatback frame at least partially defining a first upwardly extending channel adjacent said inboard side and a second upwardly extending channel adjacent said outboard side;

a safety belt restraint system mounted to and carried by said seat assembly;

a pivot arrangement interconnecting said seatback frame and said lower seat structure for selective adjustment between a plurality of angular positions relative to said lower seat structure, said pivot arrangement including an inboard pivot assembly and an outboard pivot assembly, each of said inboard and outboard pivot assemblies having a housing interconnected with said slide assembly and a connector member *unitarily constructed of aluminum and* pivotally mounted to said housing for rotation about a pivot pin, said connector member of said inboard pivot assembly at least partially extending into said first upwardly extending channel and said connector member of said outboard pivot assembly at least partially extending into said second upwardly extending channel; and a drive mechanism for rotating at least one of said connector members about its respective pivot axis and thereby pivot said seatback frame relative to said lower seat structure to adjust the angular position of said seatback frame relative to said lower seat structure, said drive mechanism includes a lead screw rotationally mounted to said lower seat frame and longitudinally extending relative to the seat assembly, said lead screw including a plurality of external threads and a distal end coupled to said connector member, whereby rotation of said lead screw in a first direction upwardly pivots said seatback frame and rotation in a second direction downwardly pivots said seatback frame.

16. The structured vehicle seat of claim 15, wherein said pivot pin is non-rotatably interconnected to said lower seat structure.

17. The structured vehicle seat of claim 16, wherein said connector member includes an internally threaded aperture in meshing engagement with said plurality of external threads of said lead screw.

*18. A structured vehicle seat, comprising:*

*a lower seat structure;*

*a seatback frame defining an upwardly extending channel;*

*a safety belt restraint system mounted to and carried by the structured vehicle seat;*

*a pivot assembly interconnecting said seatback frame to said lower seat structure, said pivot assembly including a pivot housing fixedly attached to said lower seat structure, a rotatable connector member, and a tie bar member interconnected at a first point to said rotatable connector member and interconnected to said pivot housing at a second point, said second point being spaced apart from said first point, said connector member having a seatback mounting portion fixedly interconnected to the seatback frame and a seat mounting portion pivotally interconnected to the lower seat structure, said seatback mounting portion of said pivot assembly extending within said upwardly extending channel;*

*said seatback mounting portion of said rotatable connector member includes a pair of spaced apertures which align with a pair of correspondingly spaced apertures in said seatback frame for receiving a pair of fasteners to interconnect said seatback mounting portion and said seatback frame; and*

*whereby said pivot assembly is operative for interconnecting said seatback frame to said lower seat structure such that the seatback frame is selectively adjustable to a plurality of angular positions.*

*19. The structured vehicle seat of claim 18, wherein said pivot housing further includes a first plate member, a second plate member, and a cavity between said first and second plate members, wherein said tie bar member is disposed in said cavity, wherein said first plate member, second plate member, rotatable connector member, and tie bar member each include a passage, and wherein said pivot assembly further includes a fastener disposed in each of said passages to intercouple said first plate member, second plate member, rotatable connector and tie bar member.*

*20. The structured vehicle seat of claim 19 wherein said first plate member is an outer plate member and said tie bar member is between said outer plate member and said rotatable connector member.*

*21. The structured vehicle seat of claim 20 wherein said tie bar member has a first end with said passage and a second end coupled to said outer plate member whereby said tie bar member distributes force loads from said fastener to said pivot housing.*

*22. The structured vehicle seat of claim 1 wherein said rotatable connector member is unitarily constructed of extruded aluminum.*

*23. The structured vehicle seat assembly of claim 8 wherein said rotatable connector member is unitarily constructed of extruded aluminum.*

*24. The structured vehicle seat assembly of claim 15 wherein said rotatable connector member is unitarily constructed of extruded aluminum.*

* * * * *